United States Patent [19]

Yan

[11] Patent Number: 4,701,212

[45] Date of Patent: Oct. 20, 1987

[54] RECOVERY OF MERCURY AND HEAT ENERGY FROM WASTE USING FLUIDIZED BEDS

[75] Inventor: Tsoung Y. Yan, Philadelphia, Pa.

[73] Assignee: Mobil Oil Corporation, New York, N.Y.

[21] Appl. No.: 911,550

[22] Filed: Sep. 25, 1986

[51] Int. Cl.[4] ............................................... C22B 1/10
[52] U.S. Cl. ............................................. 75/26; 75/81
[58] Field of Search ....................................... 75/26, 81

[56] References Cited

U.S. PATENT DOCUMENTS 3,704,875 12/1972 Waltrich ................................. 75/81
4,468,011 8/1984 Sikander ................................ 75/81
4,564,174 1/1986 Sikander ................................ 75/81

Primary Examiner—Peter D. Rosenberg
Attorney, Agent, or Firm—A. J. McKillop; M. G. Gilman; V. D. Harrison, Jr.

[57] ABSTRACT

Sulfur-impregnated activated carbon which has become spent by the absorption of mercury is made non hazardous for disposal purposes such as by burying. The spent carbon is at least partially combusted in a fluidized combustion zone. The solid residue is substantially reduced in mercury content. Combustion gases are cooled and condensed mercury is collected from the cooler.

7 Claims, 1 Drawing Figure

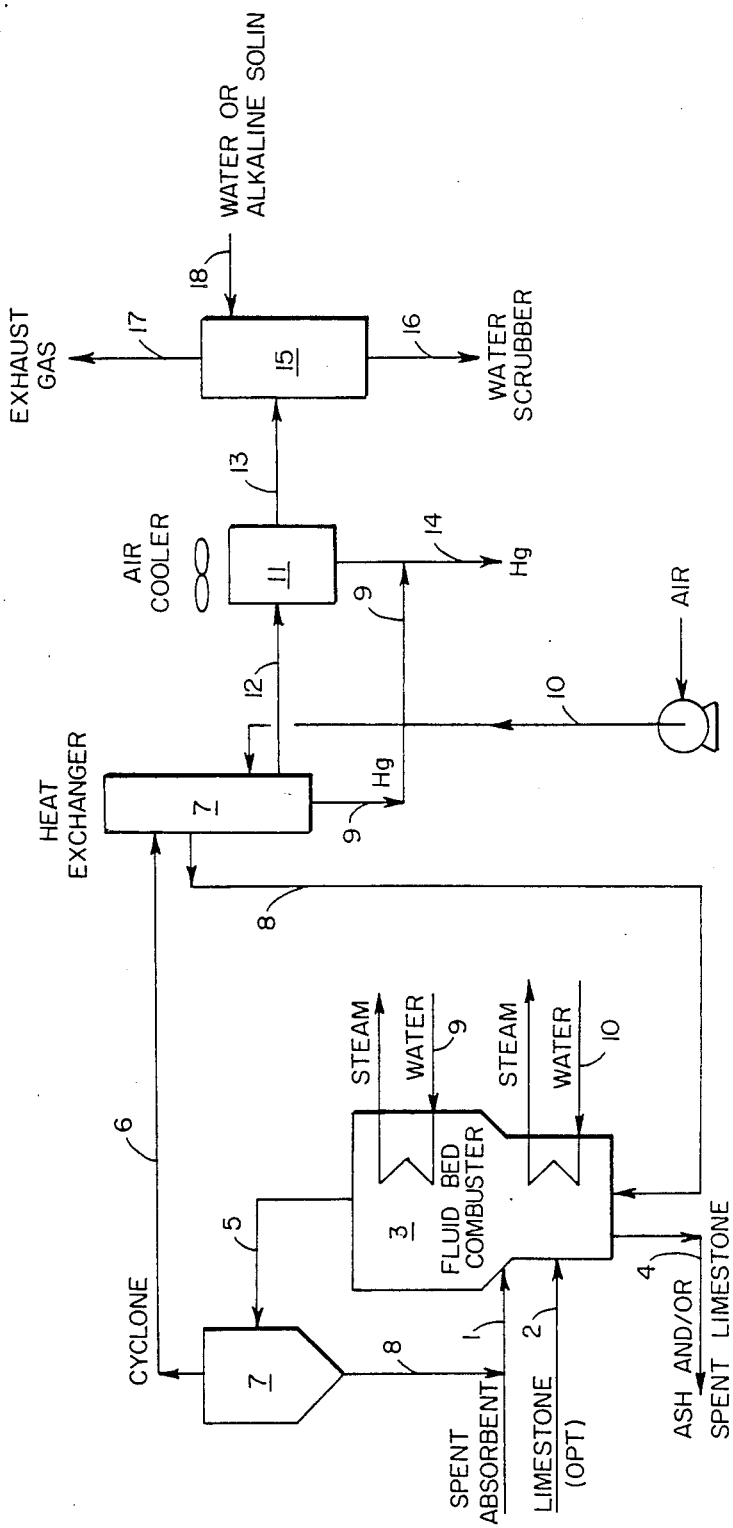
FIG. 1 PROPOSED PROCESS SCHEME

RECOVERY OF MERCURY AND HEAT ENERGY FROM WASTE USING FLUIDIZED BEDS

NATURE OF THE INVENTION

This invention relates to processes wherein mercury is removed from natural gas by flowing the gas over an activated carbon bed containing dispersed sulfur. More specifically, this invention is concerned with the disposal of the spent materials after their ability to absorb mercury has been consumed.

BACKGROUND OF THE INVENTION

The presence of mercury in produced natural gases often necessitates the use of activated carbon beds to absorb and remove the mercury from the gas. For example, U.S. Pat. No. 3,194,629 discloses a process for removing mercury from a gas contaminated with mercury comprising passing the gas over activated carbon impregnated with sulfur. Ordinarily the carbon will have deposited on it sulfur in dispersed form so that the sulfur will react with the mercury to form mercuric sulfide which is more easily fixed on the absorbent bed and which poses less of a threat to equipment located downstream. This equipment might otherwise be damaged seriously due to corrosion by the mercury. Particularly threatened are the aluminum heat exchangers used in large volume LNG plants. Depending, of course, upon the concentration of mercury in the gas treated, the adsorbent containing sulfur, mercuric sulfide and mercury eventually must be removed and replaced by fresh absorbent. Disposal of this spent sorbent material can pose a problem. It is not safe to bury the material because ground waters seeping through the buried material may become contaminated and their continued percolation to the eventual contamination of large bodies of water. The mercury present in the discarded adsorbent may also be of some value commercially and it is therefore desirable to reclaim it if at all economically possible.

A primary object of this invention therefore is to provide an economical means of recovering mercury from a spent carbon based absorbent.

Another object of this invention is to provide a method of decontaminating the waste absorbent so it can be discarded without being a hazard to human health or welfare.

DESCRIPTION OF THE DRAWINGS

The accompanying FIGURE is a schematic representation or flow sheet of a preferred embodiment of the invention.

DESCRIPTION OF THE INVENTION

The spent absorbent from a mercury removal, gas-treating process has the typical analysis:

| Components | Wt. % |
| --- | --- |
| Hg | 13 |
| S | 3 |
| Si | 2 |
| Al | 1 |
| Organics: | |
| Extractable | 20 |
| Carbon | 61 |
| Total | 100 |

This spent absorbent cannot be discarded safely without special treatment and must be stored in bulk.

In the process of this invention the spent absorbent is first fed to a fluidized bed combustor where it is combusted with air. The air is controlled and injected at a rate sufficient to combust between 40 and 100 percent of the combustible material in the spent catalyst. The fluidized bed optionally is also filled with silica sand of 80 to 700 mesh size to minimize the formation of fines. Additionally, if desired, alkaline materials such as limestone, lime, and dolomite can be added to scrub the combustion gases of sulfur oxides generated in the combustion operation. To further enhance the process economics, a steam coil can be embedded in the fluidized bed to recover steam under high pressure. If desired, other coils can also be added to recover additional heat from the combustion process. In the fluidized bed the carbon is at least partially oxidized to carbon dioxide and carbon monoxide. The exit gases flow through the top of the fluidized bed through a cyclone separator. In the separator the fines generated are recovered and recycled to the combustor. Ash and spent limestone, etc. are removed from the bottom of the fluidized bed operation. The exit gases from the combustor contain mercury vapor, carbon dioxide and water vapor. There may also be present some sulfur dioxide if no alkaline materials such as limestone, lime or dolomite are added during the initial combustion process. The hot exit gas is then cooled in a heat exchanger. When the gas is cooled to between 100° and 300° C. the mercury present is condensed to a liquid and can be recovered. The cooled gas after recovery of a mercury is then passed through additional treating steps such as the scrubber to remove other fine particles and is then exhausted. Alkali solutions such as aqueous solutions of sodium carbonate and sodium bicarbonate can also be added to remove any additional sulfur dioxide present to meet required $SO_2$ emission standards.

Referring now to the Figure, a preferred embodiment of the process of this invention will be described.

Spent absorbent comprising mainly activated carbon, sulfur, and mercury is injected through line 1 into the fluid bed combuster 3. Optionally pulverized limestone, dolomite, or other source of alkaline metal oxide is injected simultaneously into the combuster 3. Air is introduced through line 10, heat exchanger 7, and line 8 into the bottom of the combuster 3. One or more coils 9 and/or 10 are also located in the combuster. Water circulated through the coils is converted to steam which is withdrawn and used for heating purposes or as otherwise desired. Within the combuster the temperature ranges from 600° to 1000° C. and pressure from 0 to 100 psig. Combustion gases leave the combuster through line 5 and the ash and limestone solids are withdrawn from the bottom through line 4. Combustion gases containing mercury, fines, as well as some sulfur dioxide and ordinary combustion gases are then vented through the cyclone separator 7 and the separated absorbent fines recycled to the combuster system. The overhead gases are then carried to heat exchanger 7 where they supply heat to the incoming combustion air. The gas as a result is cooled and mercury condenses. The condensed mercury is collected in part in the bottom of the heat exchanger. The semi-cooled gases are then carried through line 12 to cooler 11 where the gases are cooled to between 100° and 300° C. and essentially all of the mercury is condensed and collected through line 14. The residue gas is then treated as desired such as by scrubbing in scrubber 15 and is then further processed or released.

EXAMPLE

Experiments were conducted to demonstrate this process. In a quartz tube reactor, 25 grams of a spent absorbent having the composition shown in the following table was charged. The reactor was then heated with an electric furnace progressively to a temperature of 800° C. at a rate of 8° to 9° C. per minute with air flowing at the desired rate. The burning time was started when the burning became visible or the temperature reached above 600° C. Mercury was found to have condensed at the cooler where the combustion gas was exhausted. Because of the small yield, the recovery of mercury could not be quantified accurately, however. The residue of absorbent remaining in the tube was weighed and analyzed. The results of this test are also shown in the table. From the results shown in the table it is obvious that mercury can be dirven off the spent absorbent for recovery and that the residue obtained is low in mercury and can be disposed of safely. The mercury content in the residue decreases to less than 1 ppm as the carbon combustion was increased to 99%.

| | | | Test Results | | | |
| | Burn[1] | | Residue Analysis | | | Carbon[3] |
| Run No. | Time Hrs. | Air[2] liters | Weight grams | %[4] | Carbon % | Hg ppm | Burned % |
|---|---|---|---|---|---|---|---|
| 1 | 5.0 | 300 | 0.83 | 3.3 | .05 | .59 | 99 |
| 2 | 2.9 | 174 | 1.54 | 6.2 | 45.0 | 19.0 | 97 |
| 3 | 1.8 | 108 | 5.40 | 21.6 | 78.2 | 19.0 | 79 |
| 4 | 1.2 | 72 | 8.10 | 32.4 | 81.4 | 28.0 | 68 |
| 5 | 4.7 | 564 | 0.82 | 3.3 | .06 | 3.2 | 99 |
| 6 | 2.7 | 324 | 0.69 | 2.8 | .05 | 1.0 | 99 |
| 7 | 1.6 | 339 | 1.54 | 6.2 | 40.3 | 2.0 | 97 |

[1]Hours at or above 600° C. and when burning was visible.
[2]Air volume flowed during the burning. The theoretic requirement is 222 liters.
[3]Based on: ash ($SiO_2$ and $Al_2O_3$) 3% and combustable 81%.
[4]Percent of original weight.

What is claimed is:

1. A method for converting a mercury contaminated carbon sorbent for safe disposal and for recovering mercury comprising:
    (a) oxidizing said material in a fluidized bed under conditions sufficient to effect oxidation of the carbon sorbent and sulfur present in the absorbent;
    (b) removing the hot overhead gases to a cooling means and condensing mercury therefrom; and
    (c) recovering and disposing of a solid mercury-free residue.
2. A method for converting a mercury-contaminated sulfur impregnated carbon absorbent waste material to a less hazardous material comprising:
    (a) introducing said carbon absorbent waste material in particulate form into a combustion zone;
    (b) introducing a combustion-supporting gas into said combustion zone under conditions effective to maintain said particulate material in a fluidized condition; and at least partially combusting said particulate waste material into gaseous combustion products and solid residue;
    (c) separating the solid residue formed and the gaseous products into two separate streams;
    (d) recovering said solid residue as one desired product of the process;
    (e) cooling said stream of gaseous products into a cooled gaseous stream; and
    (f) condensing and collecting mercury from said cooled gaseous stream.
3. The method of claim 2 wherein alkaline earth material is injected with said waste material.
4. The method of claim 3 wherein said alkaline earth material is selected from the group consisting of dolomite, limestone, lime and mixtures thereof.
5. The method of claim 2 wherein water is circulated through said combustion zone and converted to steam.
6. The method of claim 1 wherein the temperature in said fluidized bed is between about 600° C. and about 1000° C. and the pressure is between about 0 and about 100 psig.
7. The method of claim 2 wherein the gaseous product of step (c) is cooled in a two-stage cooling step.

* * * * *